United States Patent
Hendrickson et al.

(10) Patent No.: US 8,626,368 B2
(45) Date of Patent: Jan. 7, 2014

(54) ELECTRIC DRIVE POWER RESPONSE MANAGEMENT SYSTEM AND METHOD

(75) Inventors: Matthew Hendrickson, Dunlap, IL (US); Bradley Bailey, Peoria, IL (US); Suresh Reddy, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 532 days.

(21) Appl. No.: 12/876,358

(22) Filed: Sep. 7, 2010

(65) Prior Publication Data
US 2012/0059537 A1    Mar. 8, 2012

(51) Int. Cl.
*B60L 11/00* (2006.01)
*G06F 7/00* (2006.01)

(52) U.S. Cl.
USPC .............................. 701/22; 701/54; 701/101

(58) Field of Classification Search
USPC .............. 701/22, 54, 101; 318/140, 141, 142, 318/157
See application file for complete search history.

(56) References Cited

U.S. PATENT DOCUMENTS

| | | |
|---|---|---|
| 2,276,407 A | 8/1942 | McCune |
| 2,409,099 A | 10/1946 | Bloomfield |
| 2,482,840 A | 9/1949 | Collins et al. |
| 2,520,204 A | 8/1950 | Hancock |
| 3,216,769 A | 11/1965 | Hicks et al. |
| 3,250,973 A | 5/1966 | Dawson |
| 3,259,216 A | 7/1966 | Klaus et al. |
| 3,370,218 A | 2/1968 | Merz |
| 3,410,375 A | 11/1968 | Schmidt |
| 3,495,404 A | 2/1970 | Thompson |
| 3,562,565 A | 2/1971 | Higashino |
| 3,670,854 A | 6/1972 | Maci |
| 3,696,893 A | 10/1972 | Koivunen |
| 3,730,596 A | 5/1973 | Felix et al. |
| 3,774,095 A | 11/1973 | Coccia |
| 3,944,287 A | 3/1976 | Nagase |
| 3,992,062 A | 11/1976 | Jeffrey et al. |
| 4,031,440 A | 6/1977 | Christian et al. |
| 4,054,821 A | 10/1977 | Williamson |
| 4,083,469 A | 4/1978 | Schexnayder |
| 4,143,280 A | 3/1979 | Kuehn, Jr. et al. |
| 4,181,366 A | 1/1980 | Dobner |
| 4,270,806 A | 6/1981 | Venkataperumal et al. |

(Continued)

FOREIGN PATENT DOCUMENTS

| | | |
|---|---|---|
| JP | 05146008 | 6/1993 |
| JP | 2007306679 | 11/2007 |

(Continued)

*Primary Examiner* — Khoi Tran
*Assistant Examiner* — Jorge Peche
(74) *Attorney, Agent, or Firm* — Leydig, Voit & Mayer

(57) ABSTRACT

An electric drive system includes a fuel-driven prime mover for driving an electrical power alternator controlled at least in part by an excitation voltage is disclosed. The electrical power alternator makes electrical power available on a DC link having a voltage characteristic and a current characteristic. A method for managing the response of the alternator includes determining a voltage of the DC link and a torque command by an operator. The torque command is used to derive a mechanical power that is being commanded. A desired voltage of the DC link is determined based on the derived mechanical power, and an excitation voltage command signal is provided based on the desired voltage of the DC link by use of a closed loop controller. An actual excitation voltage is applied to the electrical power alternator based on the excitation voltage command signal.

19 Claims, 10 Drawing Sheets

(56) References Cited

U.S. PATENT DOCUMENTS

| | | | |
|---|---|---|---|
| 4,280,073 | A | 7/1981 | Miller |
| 4,292,531 | A | 9/1981 | Williamson |
| 4,313,517 | A | 2/1982 | Pivar |
| 4,482,813 | A | 11/1984 | Grand-Perret et al. |
| 4,495,449 | A | 1/1985 | Black et al. |
| 4,651,071 | A | 3/1987 | Imanaka |
| 4,659,149 | A | 4/1987 | Rumsey et al. |
| 4,671,577 | A | 6/1987 | Woods |
| 4,698,561 | A | 10/1987 | Buchanan et al. |
| 4,772,829 | A | 9/1988 | Pickering et al. |
| 4,938,321 | A | 7/1990 | Kelley et al. |
| 4,962,969 | A | 10/1990 | Davis |
| 4,965,513 | A | 10/1990 | Haynes et al. |
| 5,103,923 | A | 4/1992 | Johnston et al. |
| 5,139,121 | A | 8/1992 | Kumura et al. |
| 5,222,787 | A | 6/1993 | Eddy et al. |
| 5,280,223 | A | 1/1994 | Grabowski et al. |
| 5,293,966 | A | 3/1994 | Chareire |
| 5,302,008 | A | 4/1994 | Miyake et al. |
| 5,322,147 | A | 6/1994 | Clemens |
| 5,323,095 | A | 6/1994 | Kumar |
| 5,351,775 | A | 10/1994 | Johnston et al. |
| 5,355,978 | A | 10/1994 | Price et al. |
| 5,362,135 | A | 11/1994 | Riddiford et al. |
| 5,378,053 | A | 1/1995 | Patient et al. |
| 5,432,413 | A | 7/1995 | Duke et al. |
| 5,450,324 | A | 9/1995 | Cikanek |
| 5,469,943 | A | 11/1995 | Hill et al. |
| 5,472,264 | A | 12/1995 | Klein et al. |
| 5,476,310 | A | 12/1995 | Ohtsu et al. |
| 5,492,192 | A | 2/1996 | Brooks et al. |
| 5,511,859 | A | 4/1996 | Kade et al. |
| 5,523,701 | A | 6/1996 | Smith et al. |
| 5,539,641 | A | 7/1996 | Littlejohn |
| 5,551,764 | A | 9/1996 | Kircher et al. |
| 5,573,312 | A | 11/1996 | Muller et al. |
| 5,615,933 | A | 4/1997 | Kidston et al. |
| 5,632,534 | A | 5/1997 | Knechtges |
| 5,707,115 | A | 1/1998 | Bodie et al. |
| 5,719,485 | A * | 2/1998 | Asada .......................... 322/28 |
| 5,754,450 | A | 5/1998 | Solomon et al. |
| 5,755,302 | A | 5/1998 | Lutz et al. |
| 5,769,509 | A | 6/1998 | Feigel et al. |
| 5,775,784 | A | 7/1998 | Koga et al. |
| 5,832,395 | A | 11/1998 | Takeda et al. |
| 5,839,800 | A | 11/1998 | Koga et al. |
| 5,853,229 | A | 12/1998 | Willmann et al. |
| 5,951,115 | A | 9/1999 | Sakai et al. |
| 5,961,190 | A | 10/1999 | Brandmeier et al. |
| 5,962,997 | A | 10/1999 | Maisch |
| 5,983,149 | A | 11/1999 | Tate et al. |
| 6,076,899 | A | 6/2000 | Isella |
| 6,078,173 | A | 6/2000 | Kumar et al. |
| 6,087,791 | A | 7/2000 | Maruyama |
| 6,120,115 | A | 9/2000 | Manabe |
| 6,158,822 | A | 12/2000 | Shirai et al. |
| 6,213,567 | B1 | 4/2001 | Zittlau et al. |
| 6,226,586 | B1 | 5/2001 | Luckevich et al. |
| 6,231,134 | B1 | 5/2001 | Fukasawa et al. |
| 6,242,873 | B1 | 6/2001 | Drozdz et al. |
| 6,318,487 | B2 | 11/2001 | Yanase et al. |
| 6,325,470 | B1 | 12/2001 | Schneider |
| 6,392,418 | B1 | 5/2002 | Mir et al. |
| 6,425,643 | B2 | 7/2002 | Shirai et al. |
| 6,441,573 | B1 | 8/2002 | Zuber et al. |
| 6,456,909 | B1 | 9/2002 | Shimada et al. |
| 6,457,784 | B1 | 10/2002 | Bohm et al. |
| 6,488,344 | B2 | 12/2002 | Huls et al. |
| 6,547,343 | B1 | 4/2003 | Hac |
| 6,560,515 | B2 | 5/2003 | Inoue |
| 6,663,197 | B2 | 12/2003 | Joyce |
| 6,664,653 | B1 | 12/2003 | Edelman |
| 6,687,593 | B1 | 2/2004 | Crombez et al. |
| 6,709,075 | B1 | 3/2004 | Crombez et al. |
| 6,724,165 | B2 | 4/2004 | Hughes |
| 6,771,040 | B2 | 8/2004 | Kusumoto |
| 6,815,933 | B2 | 11/2004 | Taniguchi et al. |
| 6,885,920 | B2 | 4/2005 | Yakes et al. |
| 6,910,747 | B2 | 6/2005 | Tsunehara |
| 6,933,692 | B2 | 8/2005 | Gabriel et al. |
| 6,959,971 | B2 | 11/2005 | Tsunehara |
| 6,986,727 | B2 | 1/2006 | Kuras et al. |
| 7,029,077 | B2 | 4/2006 | Anwar et al. |
| 7,059,691 | B2 | 6/2006 | Tsunehara et al. |
| 7,104,617 | B2 | 9/2006 | Brown |
| 7,136,737 | B2 | 11/2006 | Ashizawa et al. |
| 7,196,497 | B2 * | 3/2007 | Ooiwa ............................ 322/22 |
| 7,290,840 | B2 | 11/2007 | Tsunehara et al. |
| 7,308,352 | B2 | 12/2007 | Wang et al. |
| 7,311,163 | B2 | 12/2007 | Oliver |
| 7,330,012 | B2 | 2/2008 | Ahmad et al. |
| 7,378,808 | B2 | 5/2008 | Kuras et al. |
| 7,385,372 | B2 | 6/2008 | Ahmad et al. |
| 7,529,608 | B2 * | 5/2009 | Shimizu .......................... 701/70 |
| 7,841,434 | B2 * | 11/2010 | Shimada et al. ........... 180/65.27 |
| 8,473,132 | B2 * | 6/2013 | Ichikawa et al. ................ 701/22 |
| 2001/0024062 | A1 | 9/2001 | Yoshino |
| 2002/0043962 | A1 | 4/2002 | Taniguchi et al. |
| 2002/0050739 | A1 | 5/2002 | Koepff et al. |
| 2002/0117984 | A1 | 8/2002 | Zuber et al. |
| 2002/0158606 | A1 * | 10/2002 | King ............................ 320/125 |
| 2003/0117012 | A1 * | 6/2003 | Anwar et al. .................... 303/20 |
| 2003/0132039 | A1 | 7/2003 | Gaffney et al. |
| 2003/0149521 | A1 | 8/2003 | Minowa et al. |
| 2003/0151387 | A1 | 8/2003 | Kumar |
| 2003/0169002 | A1 | 9/2003 | Hughes |
| 2004/0090116 | A1 | 5/2004 | Tsunehara |
| 2004/0095784 | A1 * | 5/2004 | Zhou ............................... 363/37 |
| 2004/0108789 | A1 | 6/2004 | Marshall |
| 2004/0163860 | A1 * | 8/2004 | Matsuzaki et al. ........... 180/65.2 |
| 2004/0239180 | A1 | 12/2004 | Foust |
| 2004/0251095 | A1 | 12/2004 | Simard et al. |
| 2005/0085980 | A1 * | 4/2005 | Kawashima et al. ........... 701/53 |
| 2005/0099146 | A1 | 5/2005 | Nishikawa et al. |
| 2005/0133285 | A1 * | 6/2005 | Shimizu ....................... 180/65.2 |
| 2005/0280400 | A1 * | 12/2005 | Ooiwa ............................ 322/28 |
| 2006/0047400 | A1 | 3/2006 | Prakash et al. |
| 2006/0055240 | A1 | 3/2006 | Toyota et al. |
| 2006/0086547 | A1 * | 4/2006 | Shimada et al. ............. 180/65.4 |
| 2006/0089777 | A1 | 4/2006 | Riddiford et al. |
| 2006/0102394 | A1 | 5/2006 | Oliver |
| 2007/0016340 | A1 | 1/2007 | Soudier et al. |
| 2007/0145918 | A1 | 6/2007 | Kumar et al. |
| 2007/0170780 | A1 * | 7/2007 | Guggisberg et al. ......... 307/10.1 |
| 2007/0182359 | A1 | 8/2007 | Wahler |
| 2008/0084229 | A1 | 4/2008 | Frommer et al. |
| 2009/0160259 | A1 * | 6/2009 | Naiknaware et al. ........... 307/82 |
| 2009/0218966 | A1 | 9/2009 | Shimada et al. ............... 318/380 |
| 2010/0066316 | A1 * | 3/2010 | Bailey et al. ..................... 322/99 |
| 2010/0066400 | A1 | 3/2010 | Hendrickson et al. ........ 324/765 |
| 2010/0066551 | A1 * | 3/2010 | Bailey et al. ................... 340/648 |
| 2010/0070120 | A1 * | 3/2010 | Bailey et al. ..................... 701/22 |
| 2010/0157638 | A1 * | 6/2010 | Naiknaware et al. ......... 363/131 |

FOREIGN PATENT DOCUMENTS

| | | |
|---|---|---|
| JP | 2007336669 | 12/2007 |
| JP | 2008306800 | 12/2008 |
| KR | 2019980065691 | 12/1998 |

* cited by examiner

ELECTRIC DRIVE POWER RESPONSE MANAGEMENT SYSTEM AND METHOD

TECHNICAL FIELD

This patent disclosure relates generally to load demand and power generation balancing, and more particularly relates to closed loop regulation of power generation output on a drive system in direct series electric drive system.

BACKGROUND

Heavy machinery, such as off-highway trucks, are commonly used in mining, heavy construction, quarrying, and other applications. Although such machines are traditionally directly driven via an internal combustion engine, the extensive fuel consumption and mechanical complexity of such systems has spurred wide-ranging exploration of alternative power systems.

One advance that has improved efficiency associated with the use of heavy machinery is the adoption of Alternating Current (AC) on electric drive systems. Electric drive systems for machines typically include a power circuit that selectively activates one or more drive motors at a desired torque. Each of the drive motors is connected to a wheel or other traction device that operates to propel the machine. An electric drive system includes a prime mover, for example, an internal combustion engine, that drives an alternator. The alternator produces electrical power that is often conditioned, and ultimately used to drive the motor. The motor transforms the electrical power back into mechanical power that drives the wheel and propels the vehicle. Electric drive systems typically require less maintenance and thus, have lower life cycle costs.

However, there are other faults associated with such machines that warrant attention in order to provide optimal machine operation. For instance, the drive systems on transmission driven vehicles are inherently stable insofar as the load applied to the engine is generated directly from ground force exertion (causing acceleration). Hence, as the vehicle accelerates, the load can steadily increase. Electric drive systems, however, may include an intermediate state of loading, the electrical system, which adds a degree of freedom. This added degree of freedom disconnects the mechanical connection between the ground and the engine, thus making the system less stable. For example, the load on the alternator, and thus the primary power source, can be increased in a step-wise manner instead of the more gradual manner usually experienced with engine driven machines. Such sudden increases in demanded power are not easily accommodated, and in some cases may cause the primary power source or the alternator to lag or ignore the power command, or in fact, to fail. Especially under unusual or abnormal driving conditions, such as abrupt starting and stopping of the vehicle, the issue of alternator power lag may become pronounced. This and other shortcomings in the state of the art are addressed by aspects of the disclosed principles.

SUMMARY

The disclosure describes, in one aspect, an electric drive system. The electric drive system includes a fuel-driven prime mover for driving an electrical power alternator controlled at least in part by an excitation voltage. The electrical power alternator makes electrical power available on a DC link having a voltage characteristic and a current characteristic. A method for managing the response of the alternator includes determining a voltage of the DC link and a torque command by an operator. The torque command is used to derive a mechanical power that is being commanded. A desired voltage of the DC link is determined based on the derived mechanical power, and an excitation voltage command signal is provided based on the desired voltage of the DC link by use of a closed loop controller. An actual excitation voltage is applied to the electrical power alternator based on the excitation voltage command signal.

In another aspect, the disclosure describes a controller for managing power generation response within an electric drive system. The electric drive system includes a fuel-driven prime mover for driving an electrical power alternator controlled at least in part by an excitation voltage. The electrical power alternator makes electrical power available on a DC link having a voltage characteristic and a current characteristic. The controller includes computer-executable instructions on a computer-readable medium. The computer-executable instructions include instructions for determining a voltage of the DC link and instructions for determining a torque command by an operator of the electric drive system. Instructions for deriving a mechanical power that is being commanded based on the torque command and instructions for determining a desired voltage of the DC link based on the derived mechanical power are executed during operation. Instructions for providing an excitation voltage command signal based on the desired voltage of the DC link by use of a closed loop controller, and instructions for applying an actual excitation voltage to the electrical power alternator based on the excitation voltage command signal are carried out during operation.

In yet another aspect, the disclosure describes a computer-readable medium having thereon computer-executable instructions for managing power generation response within an electric drive system. The electric drive system includes a fuel-driven prime mover for driving an electrical power alternator controlled at least in part by an excitation voltage. The electrical power alternator makes electrical power available on a DC link having a voltage characteristic and current a characteristic. A controller includes the computer-executable instructions on the computer-readable medium. The computer-executable instructions include instructions for determining a voltage of the DC link and instructions for determining a torque command by an operator of the electric drive system. The computer-executable instructions further include instructions for deriving a mechanical power that is being commanded based on the torque command and instructions for determining a desired voltage of the DC link based on the derived mechanical power. Instructions for providing an excitation voltage command signal based on the desired voltage of the DC link by use of a closed loop controller and instructions for applying an actual excitation voltage to the electrical power alternator based on the excitation voltage command signal are also included in the controller.

DETAILED DESCRIPTION

Figure 1A:
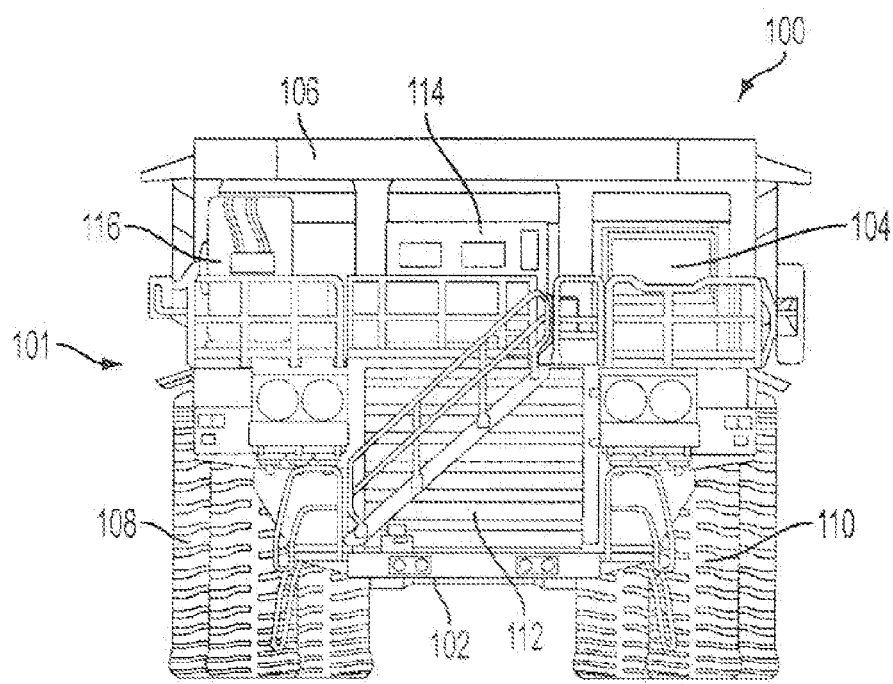
FIGS. 1A and 1B are, respectively, a front view and a side view of a machine in accordance with the disclosure.
Figure 1B:
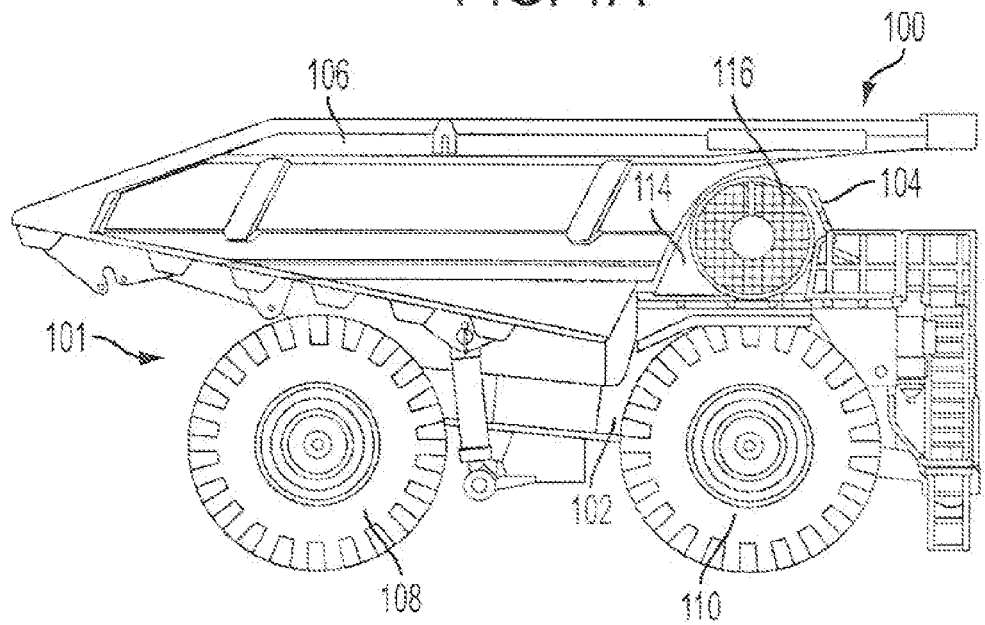

This disclosure relates to systems and methods for managing power in a direct series electric drive system, such as may be used in an off-highway truck or other heavy machine. FIG. 1A and FIG. 1B illustrate, respectively, a front and a side view of a machine 100. The machine 100 has a direct series electric drive system. One example of the machine 100 is an off-highway truck 101 such as those used for construction, mining, or quarrying. In the description that follows, this example illustrates the various arrangements that can be used on machines having direct series electric drive system systems. As can be appreciated, any other vehicle having a hybrid drive, electric-only, or direct series electric drive arrangement can benefit from the advantages described herein. The term "machine," therefore, is used to generically describe any machine having at least one drive wheel that is driven by a motor connected to the wheel. Electrical power may be generated onboard by an alternator, generator, or another power-generation device, which may be driven by an engine or other prime mover. Alternatively, electrical power may be stored but not generated on-board.

A front view of the off-highway truck 101 is shown in FIG. 1A, and a side view is shown in FIG. 1B. The off-highway truck 101 includes a chassis 102 that supports an operator cab 104 and a bucket 106. The bucket 106 is pivotally connected to the chassis 102 and is arranged to carry a payload when the off-highway truck 101 is in service. An operator occupying the operator cab 104 can control the motion and the various functions of the off-highway truck 101. The chassis 102 supports various drive system components. These drive system components are capable of driving a set of drive wheels 108 to propel the off-highway truck 101. A set of idle wheels 110 can steer such that the off-highway truck 101 can move in any direction. Even though the off-highway truck 101 includes a rigid chassis with powered wheels for motion and steerable wheels for steering, one can appreciate that other machine configurations can be used. For example, such configurations may include articulated chassis with one or more driven wheels.

Figure 2:
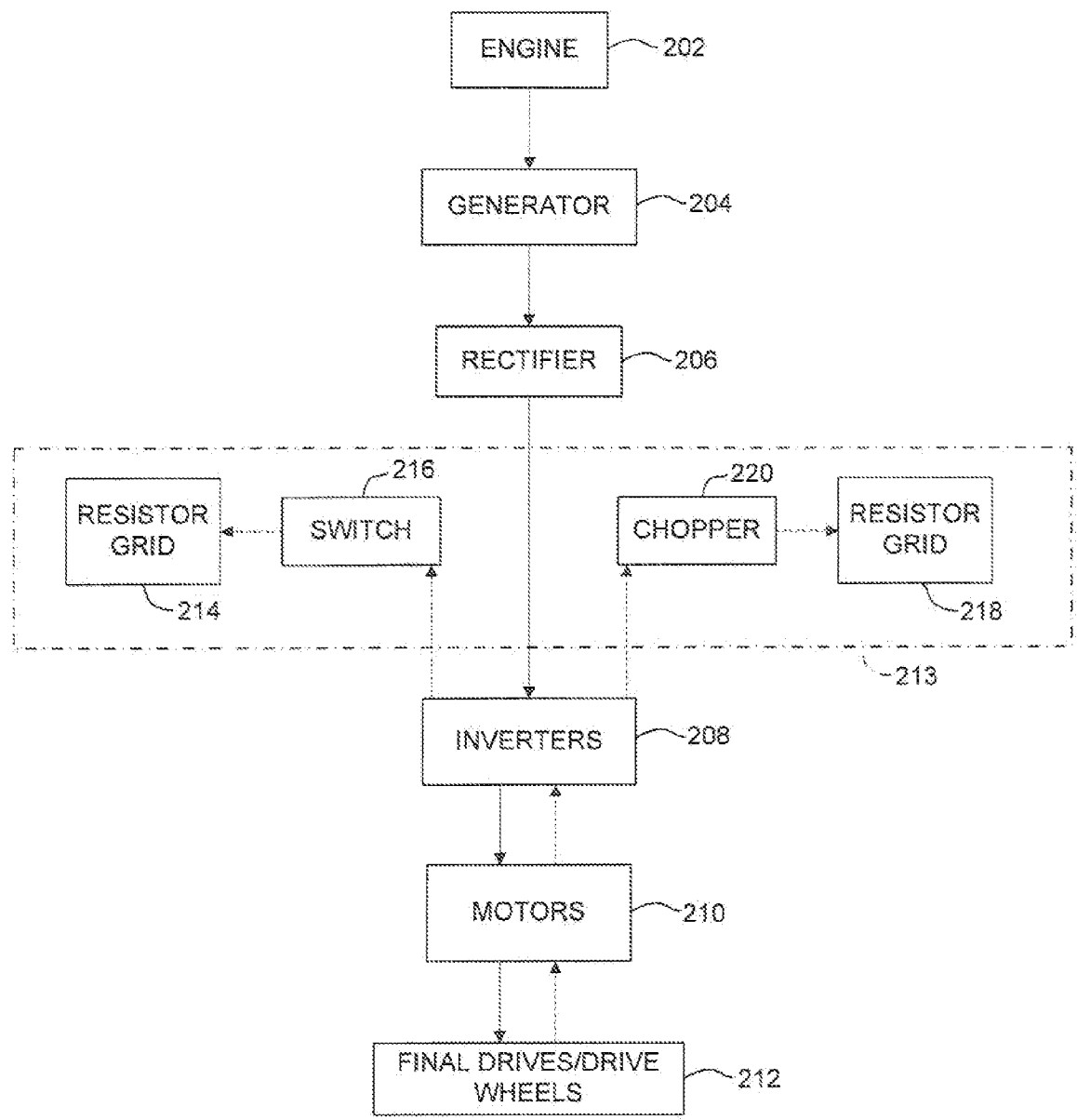
FIG. 2 is a block diagram representation of a direct series electric drive system for a machine in accordance with the disclosure.

The off-highway truck 101 has a direct series electric drive system, which in this instance refers to the use of more than one source or form of power to drive the drive wheels 108. A block diagram for the direct series electric drive system of the machine 100, for example, the off-highway truck 101, is shown in FIG. 2. In the block diagram, the flow direction of power in the system when the machine is propelled is denoted by solid-lined arrows. Conversely, the flow of power during a retarding mode is shown in dash-lined arrows. The direct series electric drive system includes an engine 202, for example, an internal combustion engine such as a diesel engine, which produces an output torque at an output shaft (not shown). The output shaft of the engine 202 is connected to a alternator 204. In operation, the output shaft of the engine 202 rotates a rotor of the alternator 204 to produce electrical power, for example, in the form of alternating current (AC) power. This electrical power is supplied to a rectifier 206 and converted to direct current (DC) power. The rectified DC power may be converted again to an AC power by an inverter circuit 208. The inverter circuit 208 may be capable of selectively adjusting the frequency and/or pulse-width of its output, such that motors 210 that are connected to an output of the inverter circuit 208 may be operated at variable speeds. The motors 210 may be connected via final assemblies (not shown) or directly to drive wheels 212 of the machine 100.

When the off-highway truck 101 is propelled, the engine 202 generates mechanical power that is transformed into electrical power, which is conditioned by various electrical components. In an illustrated embodiment, such components are housed within a cabinet 114 (FIG. 1A). The cabinet 114 is disposed on a platform that is adjacent to the operator cab 104 and may include the rectifier 206 (FIG. 2), inverter circuit 208 (FIG. 2), and/or other components. When the off-highway truck 101 is to be decelerated or its motion is otherwise to be retarded, for example, to prevent acceleration of the machine when travelling down an incline, its kinetic energy is converted to electrical energy. Effective disposition of this generated electrical power enables effective retarding of the off-highway truck 101.

Specifically, when the machine 100 is retarding, the kinetic energy of the machine 100 is transferred into rotational power of the drive wheels that rotates the motors 210, which act as electrical alternators. The electrical power generated by the motors 210 has an AC waveform. Because the inverter circuit 208 is a bridge inverter, power supplied by the motors 210 is rectified by the inverter circuit 208 into DC power. Dissipation of the DC power generated by the motors 210 produces a counter-rotational torque at the drive wheels 108 to decelerate the machine. Dissipation of this DC power may be accomplished by passing the generated current rectified by the inverter circuit 208 through a resistance. To accomplish this, a retarder arrangement 213 may include a first resistor grid 214, described in greater detail below, that is arranged to receive current from the inverter circuit 208 via a switch 216. When the switch 216 is closed, the electrical power corresponding to the current generated by the motors 210 may pass through the first resistor grid 214 and dissipate as heat. Additionally, excess electrical power is also dissipated as heat as it passes through a second resistor grid 218, which is arranged to receive electrical power via a chopper circuit 220. The chopper circuit 220 operates to selectively route a portion of the developed electrical power through the second resistor grid 218. One embodiment for the drive and retard system is described in more detail below.

Figure 3:
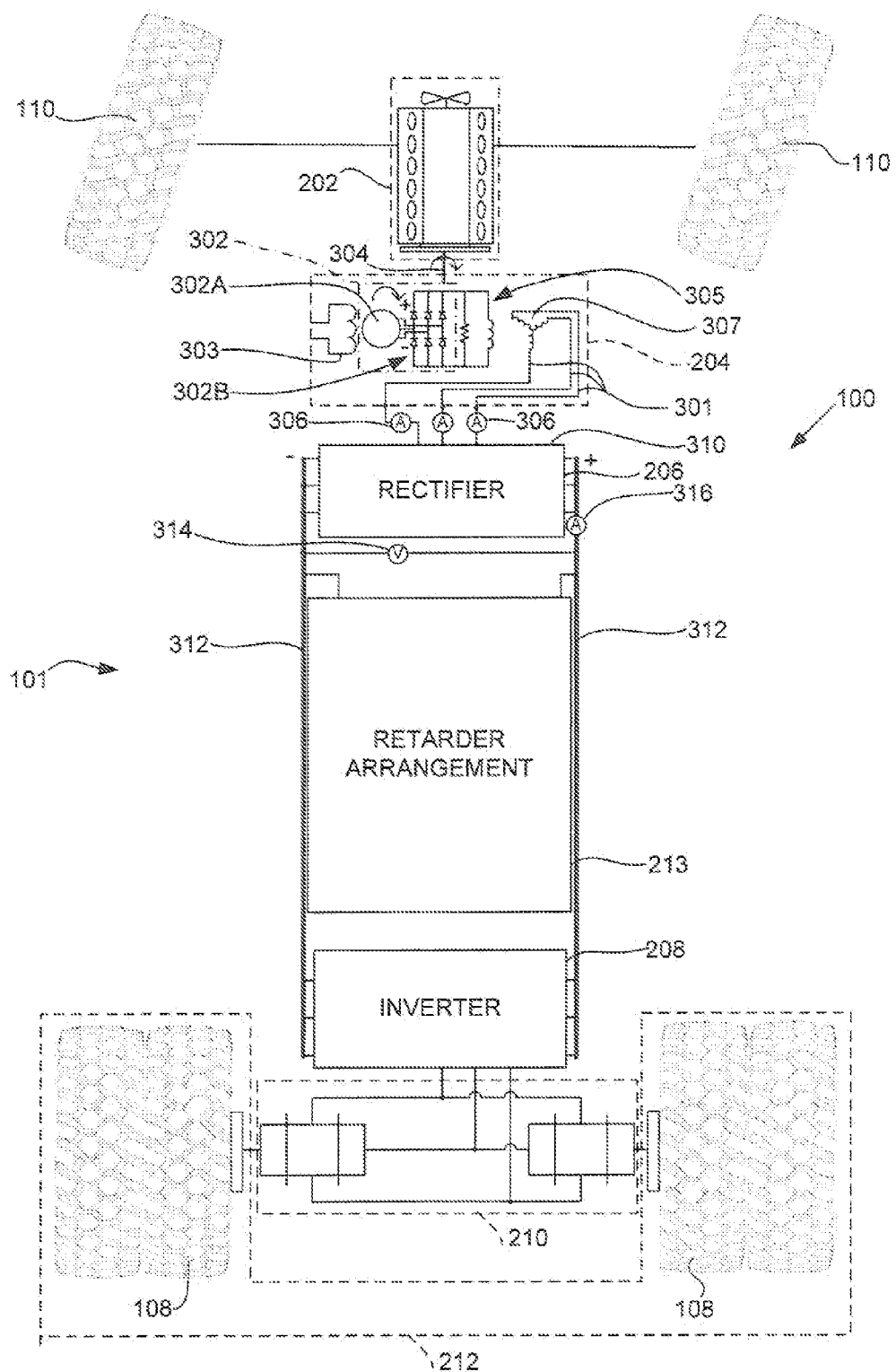
FIG. 3 is another block diagram representation of a drive system in which the disclosed principles may be deployed.
Figure 4:
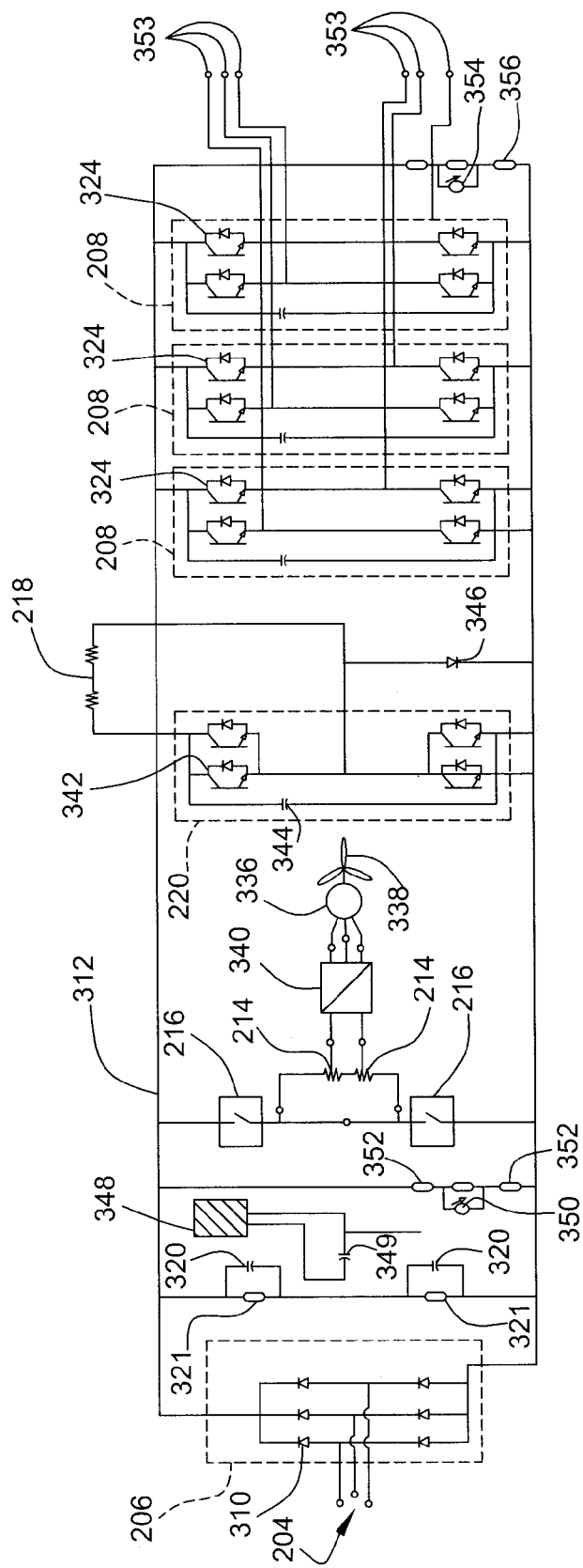
FIG. 4 is a simplified electrical circuit diagram for the power circuit used in the drive and retard system shown in FIG. 3.

A block diagram of the direct series electric drive system of the off-highway truck 101, as one example for the machine 100, is shown in FIG. 3 and FIG. 4. In these views, elements that were previously described are denoted by the same reference numerals for the sake of simplicity. Further, the block diagram of FIG. 4 includes a particular embodiment with component examples that can be included in the functional blocks shown in FIG. 3. Hence, the block diagrams shown in FIG. 3 and FIG. 4 should be referred to together when considering the description that follows. As shown, the engine 202 is connected to the alternator 204 (shown in FIG. 3) via an output drive shaft 304. Even though a direct connection to the output drive shaft 304 is shown, other drive components, such as a transmission or other gear arrangements, may be utilized to couple the output of the engine 202 to the alternator 204. The alternator 204 may be any appropriate type of alternator or alternator known in the power generation art.

In one embodiment, the alternator 204 is a three-phase alternating current (AC) synchronous alternator having a brushless, wound rotor. The alternator 204 has an output 301 for each of three phases of alternating current being generated, with each output having a respective current transducer 306 connected thereto. The rotor of the alternator 204 (shown in FIG. 3) includes a rotating rectifier 302 that is connected to a rotating exciter armature 302A. The rotating exciter armature 302A is energized by an excitation field produced by an excitation winding 303. Thus, the application of an excitation signal at the input to the excitation winding 303 creates an excitation field to activate the alternator field 305. The alternator field 305, in turn, produces the output available at three leads of the armature 307 of the alternator 204.

In the illustrated embodiment, the rotating rectifier 302 includes a rotating exciter armature 302A that is connected to an array of rotating diodes 302B. The three current outputs of the alternator 204, which are collectively considered the output of the alternator 204, are connected to a rectifier 206. If one of the array of rotating diodes 302B fails, a greater current is required to develop a given voltage. Thus, the direct series electric drive system tends to operate less efficiently when such a malfunction occurs.

The rectifier 206 converts the AC power supplied by the alternator 204 into DC power. Any type of rectifier 206 may be used. In the example shown, the rectifier 206 includes six power diodes 310 (best shown in FIG. 4) that are arranged in diode pairs around each phase of the output of the alternator 204. Each diode pair includes two power diodes 310 that are connected in series to each other, with a connection to each phased output of the alternator 204 between each pair. The three pairs of power diodes 310 are connected in parallel to each other and operate to develop a voltage across a DC linkage or DC link 312. This DC link voltage is available at a first rail and a second rail of the DC link 312. The first rail is typically at a first voltage and the second rail is typically at a second voltage during operation. Either of the first and second voltages may be zero.

During operation, a voltage is developed across the first and second rails of the DC link 312 by the rectifier 206 and/or an inverter circuit 208. One or more capacitors 320 may be connected in parallel with one or more resistors 321 across the DC link 312 to smooth the voltage V across the first and second rails of the DC link 312. The DC link 312 exhibits a DC link voltage, V, which can be measured by a voltage transducer 314, and a current, A, which can be measured by a current transducer 316, as shown in FIG. 3.

The inverter circuit 208 is connected in parallel with the rectifier 206 and operates to transform the DC voltage V into variable frequency sinusoidal or non-sinusoidal AC power that drives, in this example, two drive motors 210 (FIG. 3). Any known inverter may be used for the arrangement of the inverter circuit 208. In the example shown in FIG. 4, the inverter circuit 208 includes three phase arrays of insulated-gate bipolar transistors (IGBT) 324 that are arranged in transistor pairs and that are configured to supply a 3-phase AC output to each drive motor 210.

The inverter circuit 208 can control the speed of the motors 210 by controlling the frequency and/or the pulse-width of the AC output. The drive motors 210 may be directly connected to the drive wheels 108 or may power the final drives that power the drive wheels 212. Final drives, as is known, operate to reduce the rate of rotation and increase the torque between each drive motor 210 and each set of drive wheels 212.

In alternative embodiments, the engine 202 and alternator 204 are not required to supply the power necessary to drive the drive motors 210. Instead, such alternative embodiments use another source of power, such as a battery or contact with an electrified rail or cable. In some embodiments, one drive motor 210 may be used to power all drive wheels of the machine, while in other embodiments, any number of drive motors may be used to power any number of drive wheels, including all wheels connected to the machine.

Returning now to the block diagrams of FIG. 3 and FIG. 4, when the machine 100 operates in an electric braking mode, which is also known as electric retarding, less power is supplied from the alternator 204 to the DC link 312. Because the machine is travelling at some non-zero speed, rotation of the drive wheels 108 due to the kinetic energy of the machine 100 will power the drive motors 210. The drive motors 210, in this mode, act as alternators by producing AC electrical power. Consumption or disposition of this electrical power will consume work and act to apply a counter-rotational torque on the drive wheels 108, causing them to reduce their rotational speed, thus retarding the machine.

The generated AC electrical power can be converted into DC electrical power through the inverter circuit 208 for eventual consumption or disposition, for example, in the form of heat. In an illustrated embodiment, a retarder arrangement 213 consumes such electrical power generated during retarding. The retarder arrangement 213 can include any suitable arrangement that will operate to dissipate electrical power during retarding of the machine. In the exemplary embodiments shown in FIG. 4, the retarder arrangement 213 includes a first resistor grid 214 that is arranged to dissipate electrical energy at a fixed rate. The retarder arrangement 213 also includes a second resistor grid 218, to which DC current is supplied at a selectively variable rate by use of a pulse width modulator (PWM) or chopper circuit 220. In this way, the second resistor grid 218 dissipates electrical energy at a variable rate.

When the machine 100 is to operate in a retarding mode, the first resistor grid 214 is connected between the first and second rails of the DC link 312 so that current may be passed therethrough. When the machine 100 is being propelled, however, the first resistor grid 214 is electrically isolated from the DC link 312 by two contactors or bipolar automatic switches (BAS) 216. Each BAS 216 may include a pair of electrical contacts that are closed by an actuating mechanism, for example, a solenoid (not shown) or a coil creating a magnetic force that attracts the electric contacts to a closed position. The BAS 216 may include appropriate electrical shielding and anti-spark features that can allow these items to operate repeatedly in a high voltage environment.

When the machine 100 initiates retarding, it is desirable to close both BAS 216 within a relatively short period such that the first resistor grid 214 is placed in circuit between the first and second DC rails to begin energy dissipation rapidly. Simultaneous actuation or actuation at about the same time, such as, within a few milliseconds, of the pair of BAS 216 may also advantageously avoid charging the first resistor grid 214 and other circuit elements to the voltage present at the rails of the DC link 312. The pair of BAS 216 also prevents exposure of each of the BAS 216 or other components in the system to a large voltage difference (the voltage difference across the DC link 312) for a prolonged period. A diode 334 may be disposed in parallel to the first resistor grid 214 to reduce arcing across the BAS 216, which also electrically isolates the first resistor grid 214 from the DC link 312 during a propel mode of operation.

When the machine 100 is retarding, a large amount of heat can be produced by the first resistor grid 214. Such energy, when converted to heat, must be removed from the first resistor grid 214 to avoid an overheating condition. For this reason, a blower 338, driven by a motor 336, operates to convectively cool the first resistor grid 214. There are a number of different alternatives available for generating the power to drive the motor 336. In this embodiment, a DC/AC inverter 340 is arranged to draw power from voltage-regulated locations across a portion of the first resistor grid 214. The DC/AC inverter 340 may advantageously convert DC power from the DC link 312 to 3-phase AC power that drives the motor 336 when voltage is applied to the first resistor grid 214 during retarding.

In the illustrated embodiment, the BAS 216 are not arranged to modulate the amount of energy that is dissipated through the first resistor grid 214. During retarding, however, the machine 100 may have different energy dissipation requirements. This is because, among other things, the voltage V in the DC link 312 should be controlled to be within a predetermined range. To meet such dissipation requirements, the second resistor grid 218 can be exposed to a controlled current during retarding through action of the chopper circuit 220. The chopper circuit 220 may have any appropriate configuration that will allow modulation of the current supplied to the second resistor grid 218. In this embodiment, the chopper circuit 220 includes an arrangement of transistors 342 that can, when actuated according to a desired frequency and/or duration, modulate the current passed to the second resistor grid 218. This controls the amount of energy dissipated by the second resistor grid 218 during retarding. The chopper circuit 220 may additionally include a capacitor 344 that is disposed between the first and second rails of the DC link 312 and that regulates the voltage input to the chopper circuit 220. A switched diode 346 may be connected between the second resistor grid 218 and the DC link 312 to protect against short circuit conditions in the DC link 312 and to provide a device that can deactivate the DC link 312, for example, during service.

The passage of current through the second resistor grid 218 will also generate heat, necessitating cooling of the second resistor grid 218. In this embodiment, the first and second resistor grids 214 and 218 may both be located within the blower housing 116 (also shown in FIG. 1A and FIG. 2) for convective cooling when the motor 336 and blower 338 are active.

The embodiment for a drive system shown in FIG. 4 includes other components that are discussed for the sake of completeness. Such components are optional but are shown herein because they promote smooth and efficient operation of the drive system. In this exemplary embodiment, a leakage detector 348 is connected between the two resistors 321, in series with a capacitor 349, to the first and second rails of the DC link 312. The leakage detector 348 detects any current leakage to ground from either of the first and second rails of the DC link 312. Further, in one embodiment, a first voltage indicator 350 may be connected between resistors 352 across the first and second rails of the DC link 312. The first voltage indicator 350 may be disposed between the rectifier 206 and the retarder arrangement 213 such that a high voltage condition may be detected. In a similar fashion, a second voltage indicator 354 may be connected between resistors 356 across the first and second rails of the DC link 312. The second voltage indicator 354 may be disposed between connection nodes 353 that connect to the drive motors 210 and the inverter circuit 208 to detect a voltage condition occurring during, for example, a bus bar fracture where the DC link 312 is not continuous, in order to diagnose whether the inverter circuit 208 is operating.

Figure 5:
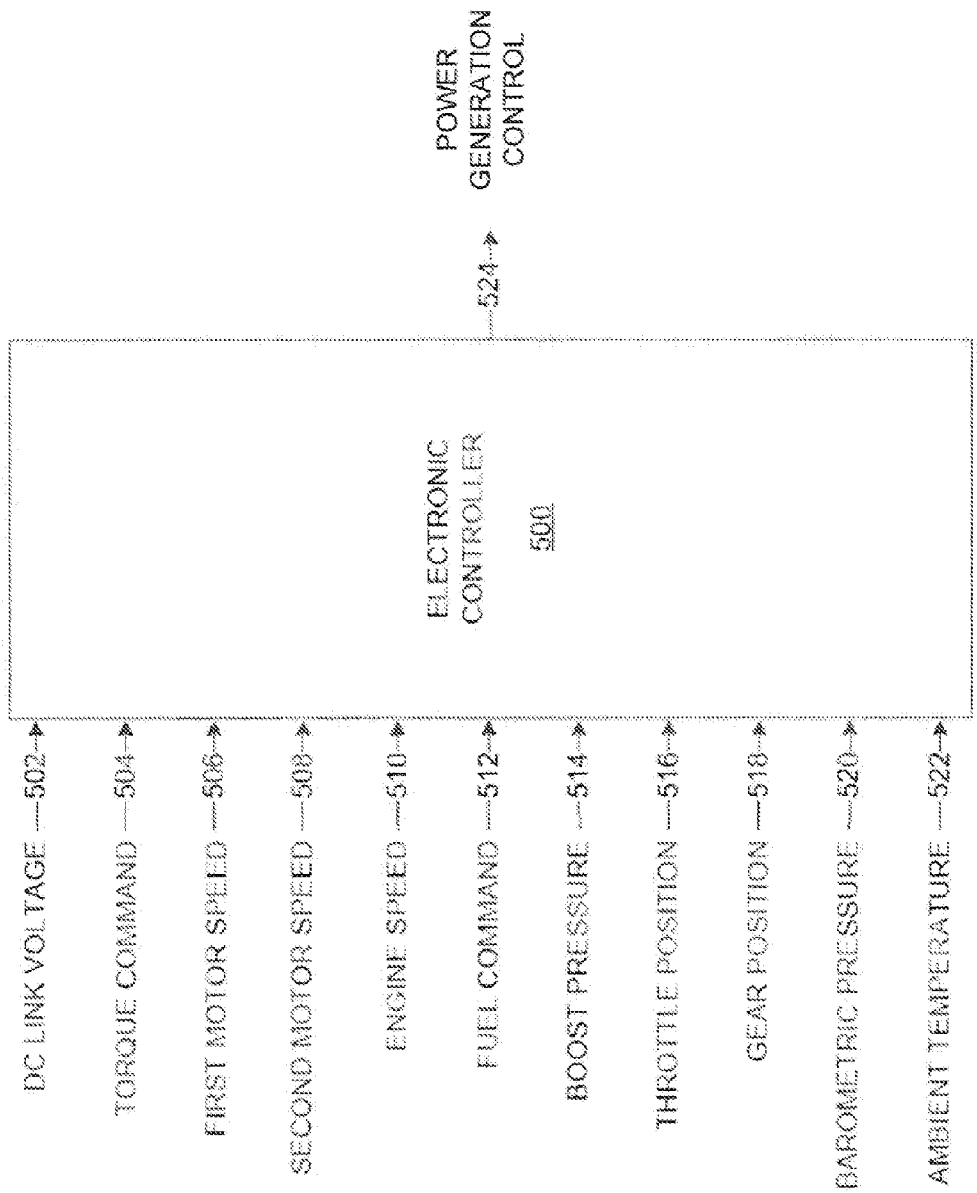
FIG. 5 is a block diagram of an electronic controller for a drive system in accordance with the disclosure.

A block diagram for an electronic controller for use in the drive system of an electric drive machine is shown in FIG. 5. The electronic controller may be a single controller or may include more than one controller disposed to control various functions and/or features of a machine. For example, a master controller, used to control the overall operation and function of the machine, may be cooperatively implemented with a motor or engine controller, used to control the engine 202. In this embodiment, the term "controller" is meant to include one, two, or more controllers that may be associated with the machine 100 and that may cooperate in controlling various functions and operations of the machine 100 (FIG. 1). The functionality of the controller, while shown conceptually in FIG. 5 to include various discrete functions for illustrative purposes only, may be implemented in hardware and/or software without regard to the discrete functionality shown. Accordingly, various interfaces of the controller are described relative to components of the drive system shown in the block diagram of FIG. 3. Such interfaces are not intended to limit the type and number of components that are connected, nor the number of controllers that are described.

It will be appreciated that the controllers discussed herein are or comprise a computing device, e.g., a processor, which reads computer-executable instructions from a computer-readable medium and executes those instructions. Media that are readable by a computer include both tangible and intangible media. Examples of the former include magnetic discs, optical discs, flash memory, RAM, ROM, tapes, cards, etc. Examples of the latter include acoustic signals, electrical signals, AM and FM waves, etc. As used in the appended claims, the term "computer-readable medium" denotes only tangible media that are readable by a computer unless otherwise specifically noted in the claim.

In FIG. 5, a controller 500, which can be an electronic controller, is disposed to receive a voltage signal provided at a node 502, which voltage signal is indicative of the instantaneous DC voltage present at the DC link 312 (FIG. 3). The voltage transducer 314, for example, measures this value. In a similar fashion, the controller 500 receives a torque command signal provided at a second node 504, which is indicative of the torque being commanded by an operator of the machine. The torque command signal may be generated directly or indirectly by an accelerator pedal or lever that is displaced by the operator. In an alternate embodiment, the torque command signal may be generated by the same or another controller of the machine, e.g., a speed governor.

In one embodiment, the machine 100 (FIG. 1A) may include sensors that measure the rotational speed of each of the drive motors. For example, the motors 210 (FIG. 3) may each have a speed sensor (not shown) integrated or otherwise associated therewith. Each speed sensor may be arranged to measure a rotational speed of each motor 210 and make such information available to the electronic controller 500 via appropriate connections there between. Hence, the electronic controller 500 receives first and second motor speed signals at a third and fourth nodes 506 and 508, respectively. In one embodiment, the first and second motor speed signals are indicative of the rotational speed of each of two electric drive motors of the machine. In an alternative embodiment having fewer or more than two drive motors, the electronic controller may be arranged to receive a respective drive motor speed signal for each drive motor of the system.

The electronic controller 500 further receives signals indicative of operating parameters of the engine. For example, the electronic controller receives an engine speed (RPM) at a fifth node 510, which is indicative of the rotational speed of the engine. The electronic controller 500 may receive other information from the engine or a separate controller (not shown) that is connected to the engine. Such other engine parameters can include an actual fuel command to the injectors of the engine at a sixth node 512, a boost pressure or air pressure in the intake manifold of the engine at a seventh node 514, and other parameters.

The electronic controller 500 may also receive signals indicative of other parameters that relate to the operation of other machine systems or to the operating environment of the machine. Such signals include a throttle position at an eighth node 516. The throttle position signal may be a signal indicative of the position as well as the rate of change of position of a control of the operator that is used to set the acceleration state of the machine. A gear position at a ninth node 518 carries a signal that is indicative of the state of a gear system of the machine. Such a gear system may be employed, for example, to set a travel direction of the machine, to adjust the torque between one or more drive motors of the machine and the wheels, to operate a motor connected to an implement of the machine, and so forth. Lastly, the electronic controller 500 may receive other inputs that are indicative of the operating environment of the machine, such as a barometric pressure at tenth node 520, an ambient temperature at an eleventh node 522, and others.

The electronic controller 500 is connected to and operates to control the operation of various components and systems of the machine. In one embodiment, the electronic controller 500 is connected to the inverter circuit 208 that operates the drive motors 210 (FIG. 3). The electronic controller 500 is arranged to control the power generation of the system, for example, by adjusting the excitation voltage to control the voltage at the DC link 312 during operation, by sending an appropriate power generation control command signal to the alternator 204 via first output node 524. The power generation control command signal may be appropriately limited and modified to represent the maximum permissible increase or, in general, rate of change of power generation that the direct series electric drive system can deliver under any given steady state or transient operating circumstances. The methods of limiting and modifying the generation control command signal by the electronic controller 500 are described below.

The electronic controller 500 is capable of executing control algorithms that provide closed loop regulation of power generation output, for example, of the voltage at the DC link 312 (FIG. 3) by employing various compensation schemes such as proportional/integral (PI) control with lead compensation, non-linear gain scheduling of controller gain parameters and others, which are configured to provide robust and fast closed loop response. From a broad perspective, the electronic controller 500 can consider the operating state of the alternator in terms of predicting the state of the magnetic fields when changes in the operation of the machine are commanded, as well as being capable of proactively effecting changes in the power generation of the system based on a load change indication in a manner that maintains stability in the system by reducing lag in the response of the power generation system. At the same time, the electronic controller may also be capable of predicting the rate of change of delivery of power by the engine when the engine is undergoing transient state changes, as well as being able to cope or react to operating conditions that would tend to place the engine in an underspeed condition, for example, when load increases occur suddenly in the drive system as would occur when a fully loaded machine begins ascending a steep incline from a dead stop.

To address such conditions, concurrent changes to the power of the alternator by adjustment of the excitation signal are required. If such conditions are not effectively addressed, a mismatch in the power supply and consumption of the drive system may occur, which can lead to either a drop in the voltage of the DC link or to a dramatic increase in the current of the DC link during operation. In the embodiments of the present disclosure, proactive control of power generation is used to insure that sufficient power is generated to accommodate a change in power consumption. Such proactive control of power generation may be implemented instead of or in addition to other power management or power generation and consumption balancing methods. For example, a previously proposed control device and method effected changes to the power consumption of the system by adjusting the torque commanded to the drive motors.

One such previously proposed solution is described in further detail in co-pending U.S. patent application Ser. No. 12/210,896, which was published on Mar. 18, 2010, as Pub. No. US 2010-0066277 A1, is entitled "Load Demand and Power Generation Balancing in Direct Series Electric Drive System," and the contents of which are incorporated herein by reference in their entirety. In this previously proposed solution, the power consumption of the system, i.e. the torque commanded to the motors, is limited by the ability of the power generation system to change its output. In the present disclosure, a proactive control of the power generation system enables a faster response of the power generation system that can be used in addition to or instead of load consumption management techniques. When used in addition to a power consumption management technique, such as that described in the aforementioned application, the limiting of the torque commands may be minimized or even avoided under various operating conditions. These and other functions of the electronic controller 500 are described below relative to exemplary embodiments.

Figure 6:
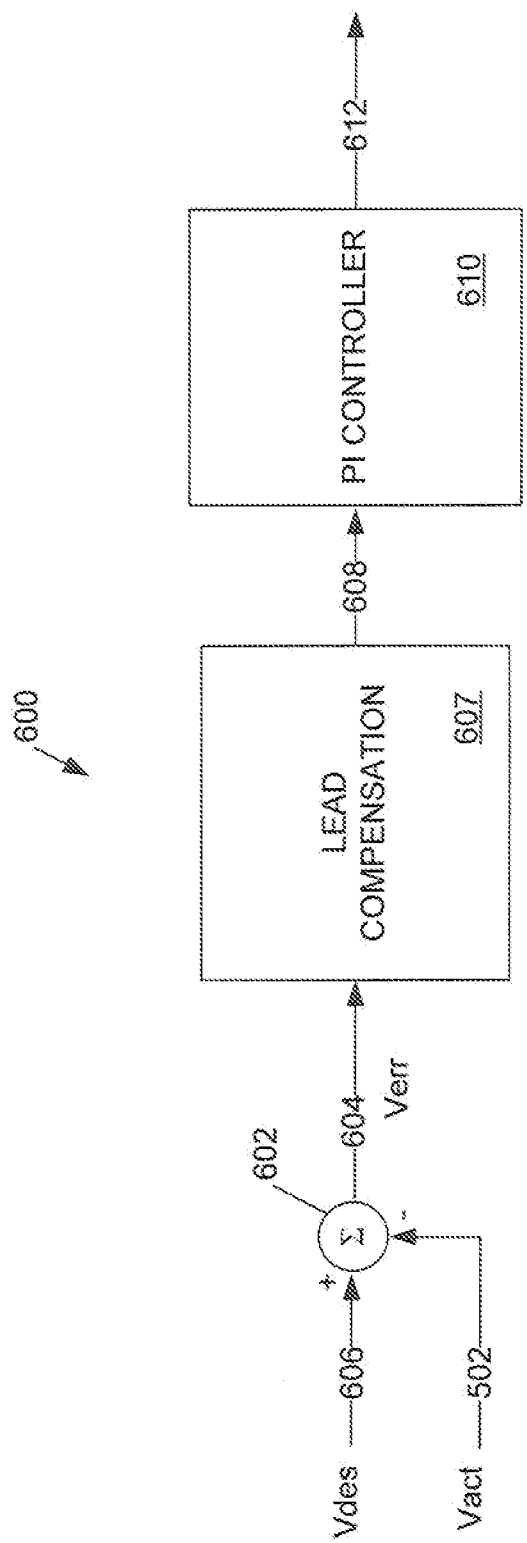
FIG. 6 is a block diagram for a power management controller in accordance with the disclosure.

FIG. 6 represents one embodiment for an electronic controller 600, which is illustrated as a block diagram of various functional algorithms that are included in the electronic controller 600. The electronic controller 600 includes subroutines that can impose predictive control to the power generation system of the machine 100 (FIG. 1A) in response to the load consumption of the system, by implementing various compensation schemes such as a closed loop PI controller with lead compensation, non-linear gain scheduling of controller gain parameters, and other techniques. The techniques described herein provide robust, fast, and stable system response.

More specifically, the electronic controller 600 includes a summing junction 602 that calculates a voltage error value, Verr 604, between a desired DC link voltage value, Vdes 606, and the actual DC link voltage value, Vact 502 (FIG. 5). The desired voltage value Vdes 606 may be a value calculated based on various parameters, for example, a load or torque command, or may be a value determined based on an operating condition of the machine.

The voltage error value Verr 604 is indicative of a change in voltage that is required in the DC link to meet the demands of the system. In the illustrated embodiment, system stability is promoted by appropriately commanding a change in the excitation voltage of the generator. Such change in the excitation voltage of the alternator is arranged to provide the required voltage change in the DC link while still remaining within the acceptable rates of change of the various parameters in the system as well as in a fashion that minimizes or avoids torque limiting. Accordingly, the error value Verr 604 is provided to a lead compensator function 607 which compensates for inertia delays in the system. The lead compensator function is described in further detail relative to FIG. 7 below. A compensated error value 608 provided by the lead compensator function 607 is provided to a closed loop controller, for example, the proportional/integral (PI) controller 610, which is configured to provide an excitation voltage command 612. The PI controller 610 is described in more detail below relative to FIG. 8. By use of the disclosed configuration, the DC link voltage will change in response to changes in the excitation voltage command 612 such that the error Verr 604 is minimized during operation.

Figure 7:
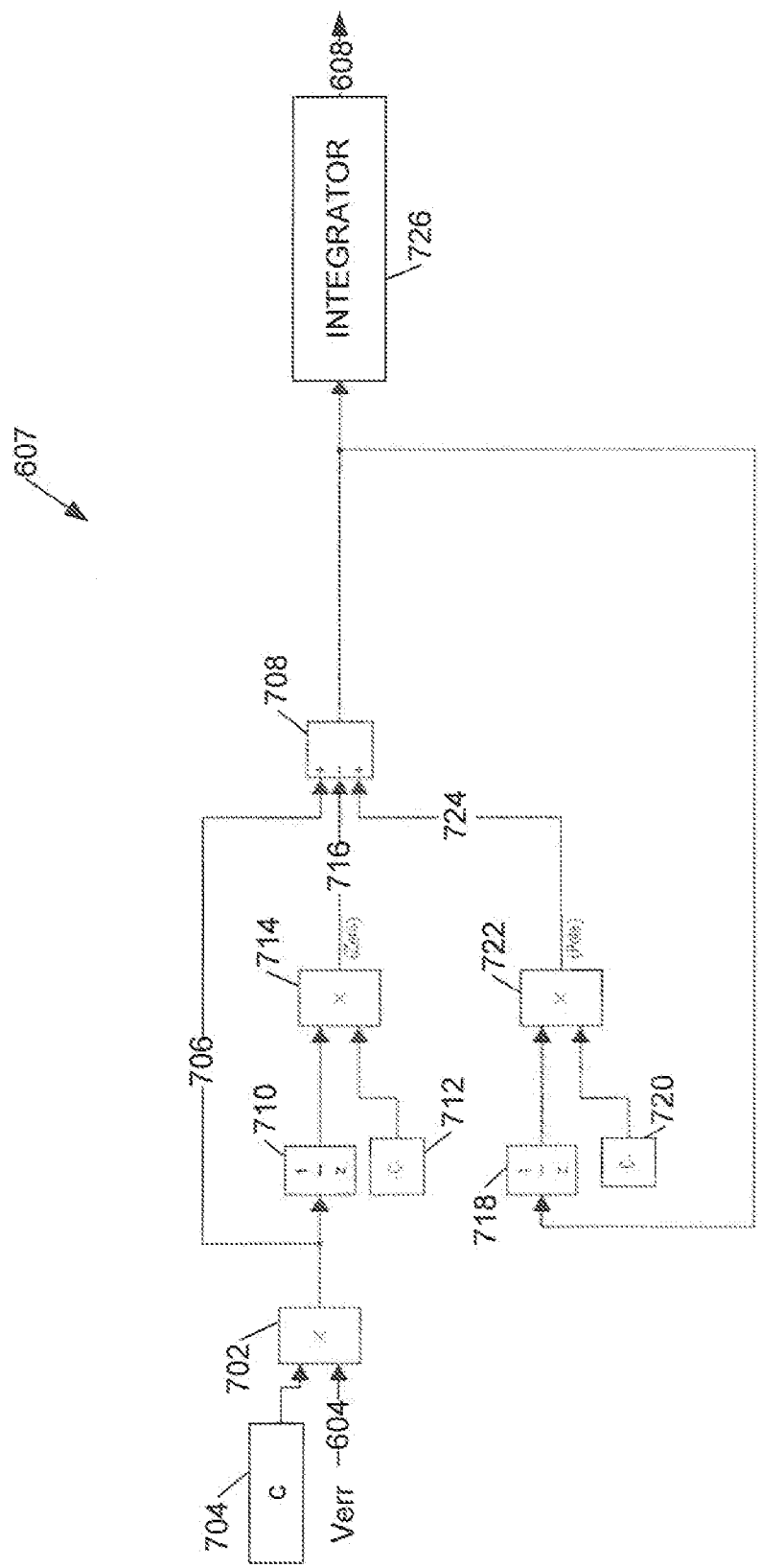
FIG. 7 is a block diagram of a lead compensator in accordance with the disclosure.

A block diagram of one embodiment of the lead compensation function 607 is shown in FIG. 7. As shown, the lead compensation function 607 receives the voltage error Verr 604 as an input to a multiplier junction 702. A voltage error gain 704, which may be a constant or variable parameter, is multiplied into the voltage error Verr 604 to provide a scaled error value 706. Scaling of the error value in this fashion is done to insure that the proper units and magnitudes of the error are used in subsequent calculations.

The scaled error value 706 may generally be regarded as the extent to which the output voltage of the alternator must be changed. The alternator or DC link voltage is changed by a corresponding change in the magnitude of the excitation voltage provided to the alternator, for example, at the excitation windings 303 (FIG. 3). In this way, the response of the alternator to a changing excitation voltage may be analyzed as a dynamic system having excitation voltage as an input and DC link voltage as an output. As with any dynamic system, a rational transfer function of the response of the alternator output to a changing excitation voltage input will have zeros and poles when plotted on the complex plane. Thus, by understanding the stable regions of a system's response, a filter may be used to insure a stable system response regardless of input fluctuation. Thus, the lead compensation function may operate as a filter in addition to providing other functions.

More specifically, the scaled error value 706 is provided to a summing junction 708. The scaled error value 706 is also provided to a polar coordinate transform 710, the result of which is multiplied by a zero gain 712 at a multiplier 714. The result of the multiplication at 714 represents a zero compensation term 716, which is subtracted from the scaled error value 706 at the junction 708. The difference between the scaled error value 706 and the zero compensation term 716 is again transformed to polar coordinates at 718 and is multiplied by a pole gain 720 at a multiplier 722. The result of this multiplication is a pole compensation term 724. In an implementation of an electronic controller that conducts calculations in cyclical fashion, the pole compensation term 724 corresponds to the immediately previous value of the scaled error value 706.

The result of the summing junction 708, which represents a compensated error value based on the poles and zeros of the system, is provided to an integrator filter 726. The integrator filter 726 provides the compensated error value 608 (also shown in FIG. 6) as its output. As previously discussed, the compensated error value 608 is provided to the PI controller 610. A block diagram of one possible implementation of the PI controller 610 is shown in FIG. 8.

Figure 8:
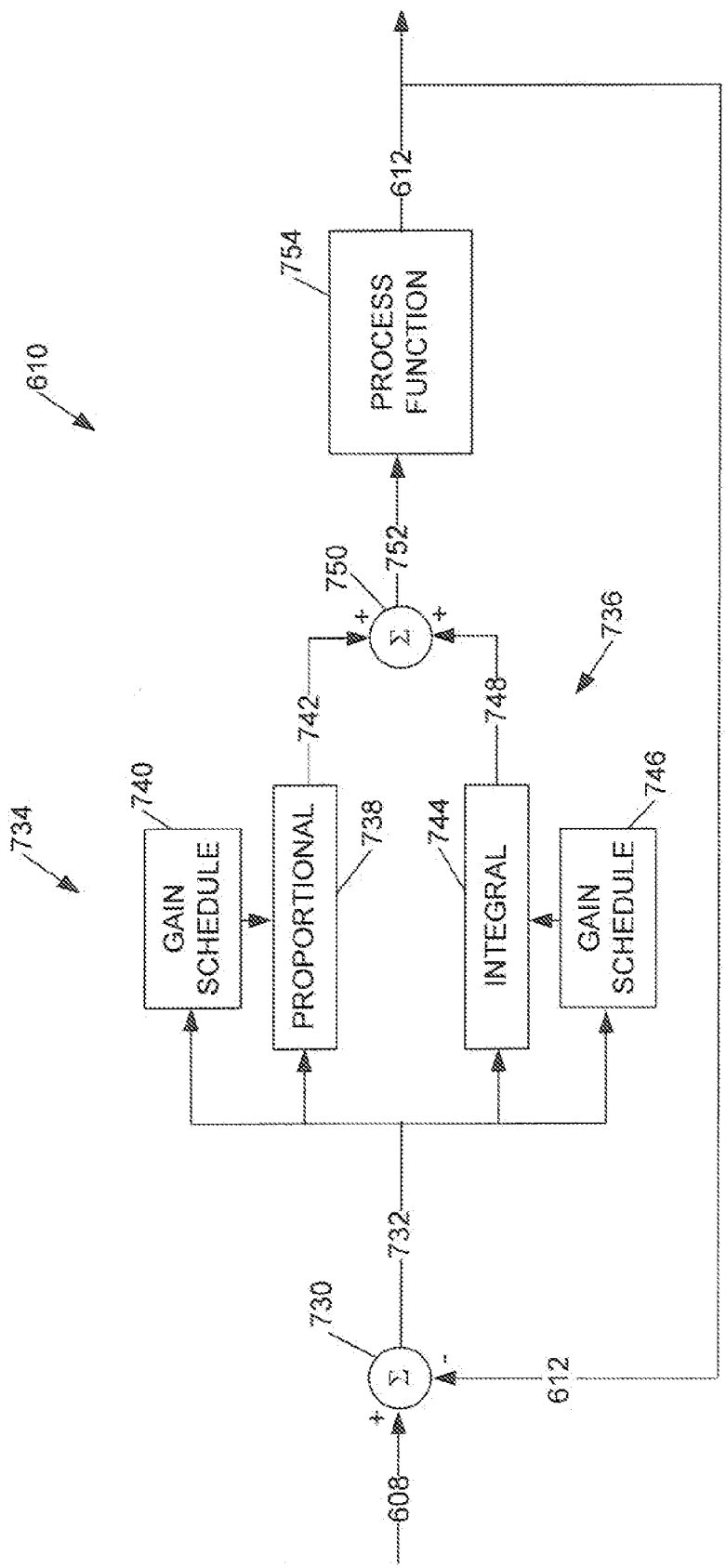
FIG. 8 is a block diagram of a proportional/integral controller in accordance with the disclosure.

In reference to FIG. 8, a typical PI controller 610 is shown, although other control algorithms may be used. To promote system stability over a broad range of operating conditions, the PI controller 610 includes gain scheduling. The control input to the PI controller 610 is the compensated error value 608, which drives the excitation voltage command 612 as an output. In this way, changes in the actual and desired DC link voltages Vdes 606 and Vact 502, which determine the compensated error value 608, directly determine changes in the excitation voltage command 612, which as previously described determines the actual voltage Vact 502 provided to the DC link by the alternator.

As shown, the PI controller 610 includes a summing junction 730 that determines a voltage error difference 732 based on the different between the compensated error value 608 and the excitation voltage command 612. In other words, the PI controller 610 is a closed loop controller that uses its output, the excitation voltage command 612, as feedback. The voltage error difference 732 is provided separately to a proportional term calculation 734 and to a integral term calculation 736.

The proportional term calculation 734 includes a proportional function 738 that essentially multiplies the voltage error difference 732 by a proportional gain 740 to provide a proportional term 742. Although the proportional gain 740 may be a constant, it may also be determined dynamically according to a gain schedule. Any appropriate machine parameter may be used as the basis for determining the proportional gain according to the gain schedule such that the response time and stability of the PI controller 610 may be improved. In the illustrated embodiment, the voltage error difference 732 is used as an input to the gain schedule determinator, which in the illustrated embodiment is a non-linear function. For instance, the proportional gain may be increased for large values of the voltage error difference 732 and be reduced for small values such that the time response of the system may be improved. The gain schedule determinator may operate as a single dimensional equation, a lookup table, a model based algorithm, and the like.

Similar to the proportional term calculation 734, the integral term calculation 736 includes an integral function 744 that calculates a value indicative of the rate of change of the voltage error difference 732. The rate of change of the voltage error difference 732 is scaled by an integral gain 746. The scaled integral value is provided as an integral term 748. Although the integral gain 746 may be a constant, it may also be determined dynamically according to a gain schedule. Any appropriate machine parameter may be used as the basis for determining the integral gain according to the gain schedule such that the response time and stability of the PI controller 610 may be improved. In the illustrated embodiment, the voltage error difference 732 is used as an input to the gain schedule determinator. For instance, the integral gain may be decreased for large values of the voltage error difference 732 and be increased for small values such that the time response of the system may be improved. The gain schedule determinator may operate as a single dimensional equation, a lookup table, a model based algorithm, and the like.

The proportional and integral terms 742 and 748 are added at a summing junction 750 to yield a control signal 752. The control signal 752 is converted in a process function 754 to become the excitation voltage command 612. The process function 754 may include unit and other conversions to appropriately format the control signal 752 into a value that is appropriate for commanding a change in the excitation voltage. For example, the process function 754 may convert the otherwise continuous values provided by the control signal 752 into discrete values, such as in the form of a pulse width modulated (PWM) signal. Moreover, the process function 754 may include maximum and minimum value delimiters for the excitation voltage command 612, which are configured to maintain the output within a predetermined range that may be fixed or variable.

INDUSTRIAL APPLICABILITY

The industrial applicability of the methods and systems for power management as described herein should be readily appreciated from the foregoing discussion. The present disclosure is applicable to many machines and many environments. One exemplary machine suited to the disclosure is an off-highway truck. Exemplary off-highway trucks are commonly used in mines, construction sites, and quarries. Entities that use these off-highway trucks often sustain significant monetary losses from an off-highway truck that is not operating at peak efficiency.

Off-highway trucks, particularly those adapted to use electric, hybrid, or direct series electric drive systems, are subject to sudden load changes, and it can often be difficult to accommodate such load changes. Thus, a method and system that can improve the speed and accuracy with which a machine responds to changing power demands can significantly increase operating efficiencies.

Further, the methods and systems described above can be adapted to a large variety of machines and tasks. For example, other types of industrial machines, such as backhoe loaders, compactors, feller bunchers, forest machines, industrial loaders, skid steer loaders, wheel loaders and many other machines can benefit from the methods and systems described.

Figure 10:
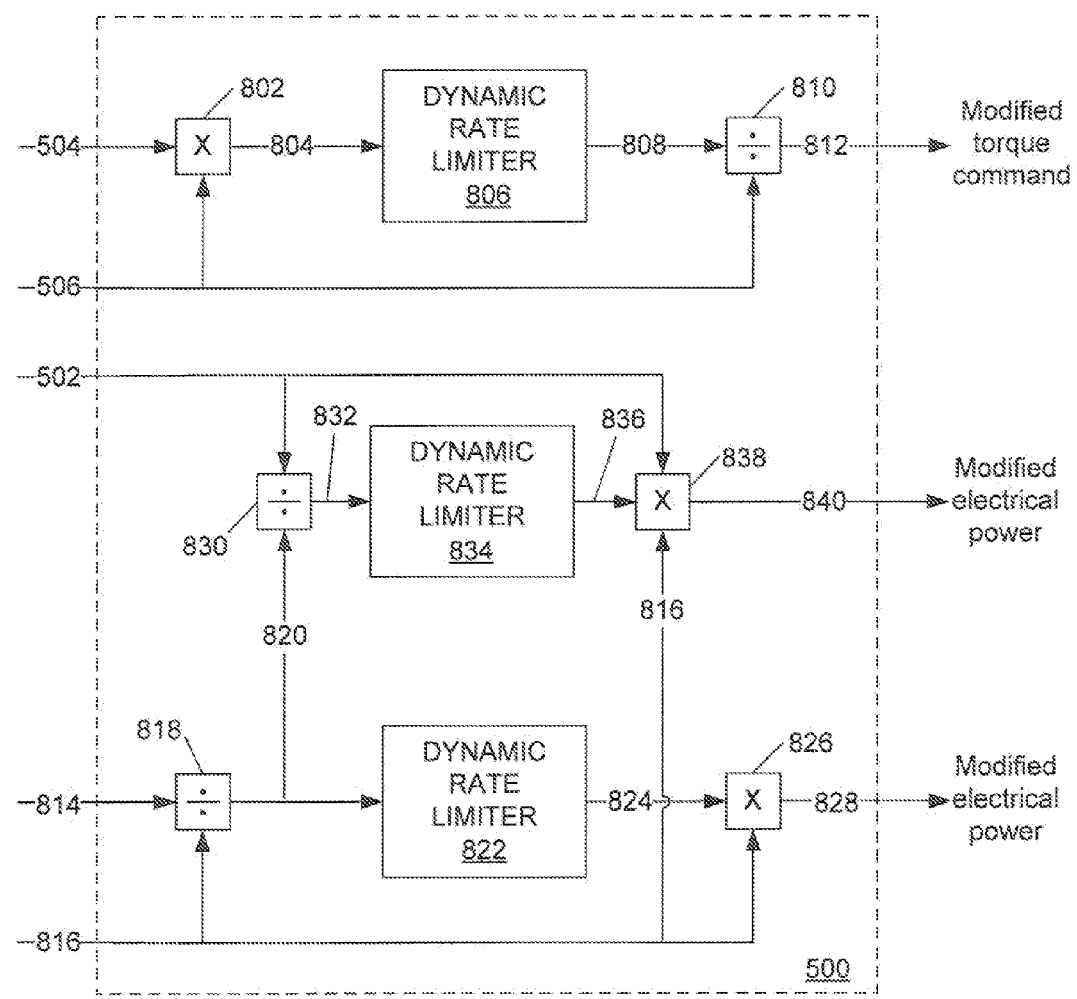
FIG. 10 is a block diagram of an alternative embodiment of an electronic controller in accordance with the disclosure.

In one alternative embodiment, the active control of the power output of the alternator may be augmented by the addition of dynamic ramp rate limiters to various parameters, which limiters can be customized to match the physical characteristics of components of the drive system, such as the electric motors, the alternator, and the like. The limiters described below and/or other similar limiters may be used instead of or, advantageously, in addition to the active controller described herein. Accordingly, a partial block diagram of functionality that may be found within the electronic controller 500 (FIG. 5) in addition to functionality already described is shown in FIG. 10.

In the illustrated embodiment, the electronic controller 500 includes additional functionality to limit the rate of change of various parameters dynamically during operation. More specifically, the torque command 504 is multiplied by a motor speed, for example, the first motor speed 506, at a multiplier 802. Alternatively, the speed of the second or any other motor may be used. In one embodiment, the controller may use the average speed of all drive or other motors on a machine. The product 804, which represents a normalized torque command based on the then present speed of one or more motors, is provided to a dynamic rate limiter 806.

The dynamic rate limiter 806 may be any appropriate function or operation that controls or limits the rate of change of a parameter during operation. For example, the limiter 806 may be a derivative based calculation, a filter, or any other appropriate type of function that avoids spikes or valleys in a parameter signal that exceed a predetermined minimum or maximum magnitude. In the illustrated embodiment, the limiter 806 may include a comparator that compares a current with a previous value and delimits that difference based on a predetermined threshold.

The output 808 of the limiter 806 is a rate-adjusted parameter generally indicative of power, which is divided by the motor speed 506 at a divider 810 to yield a modified torque command 812. During operation, the modified torque command 812 will track the torque command 504 but will advantageously avoid excessive changes in the value of the torque command 504 that may result in a mismatch between the torque commanded of the system and the transient torque capability of the system. The normalization of the torque command by the motor speed, which may have units equivalent to power, can help insure that that the rate limiting is consonant with the power state of the machine during operation.

A similar configuration is used to control the rate of change of other parameters. In the illustrated embodiment, the controller 500 is further configured to dynamically limit the rate of change of the DC link voltage parameter 502 (FIG. 5) and of the electrical power of the drive motors. Accordingly, a motor power 814 and, optionally, a motor efficiency 816 are provided to the controller 500. The motor power 814 may be a value indicative of the power collectively used by the drive motors of a machine at any given time. The motor efficiency 816 is a parameter indicative of the operating efficiency of the electric drive system that can be calculated based on known system response as well as based on environmental conditions such as ambient temperature.

The motor power 814 is divided by the motor efficiency 816 at a divider 818 to yield a corrected power value 820, which is provided to an additional rate limiter function 822 that yields a rate-adjusted power value 824. The motor efficiency 816 is multiplied back out of the rate-adjusted power value 824 at a multiplier 826 to yield a modified electrical power value 828, which can be used in the controller 500 for various calculations and operations. The modified electrical power value 828 is indicative of a realistic estimation of the physical capability of the motors to consume or otherwise use electrical power during operation because, in one aspect, it accounts for various mechanical aspects of the structure of the electrical drive system such as moment of inertia, machine payload, grade of travel, and the like.

The expected DC link voltage 502 is also used as a basis for modifying the corrected power value 820 as the drive system is the largest consistent consumer of electrical power in the drive system. More particularly, the corrected power value 820 is divided by the DC link voltage 502 at a divider 830 to yield a corrected DC link current value 832. The corrected DC link current value 832 is provided to yet another dynamic rate limiter function 834 that yields a rate-adjusted DC link current value 836. The DC link voltage 502 and the motor efficiency 816 are multiplied back out of the rate-adjusted DC link current value 836 at a multiplier 838 to yield a modified electrical power 840, which can then be used in the various calculations and estimations of the controller 500. In this way, the operation of the machine can become more stable insofar as the various mechanical aspects of the operation of the alternator, such as inertia, ambient temperature and the like, can be considered when changes in the voltage of the DC link are required.

In general, the systems and methods described herein are well suited for applications of propulsion systems in which the torque applied to move a machine is based on operator requests, such as a throttle input command signal, as well as machine operating parameters, such as a motor torque versus speed curve. In this type of propulsion configuration, changes in the alternator power output are required. The method described herein provides for such changes that are arranged to match the power requirements of a system while minimizing the torque limiting of command signals that were previously used to match the power output of the alternator to the maximum feasible power consumption of the machine. In this way, mismatches of load and power supply are minimized during certain operating conditions of the machine, such as hill starts, in which the change in power can be high, grade changes, in which although power may remain constant while the driving voltage may change with motor speed, and others.

Figure 9:
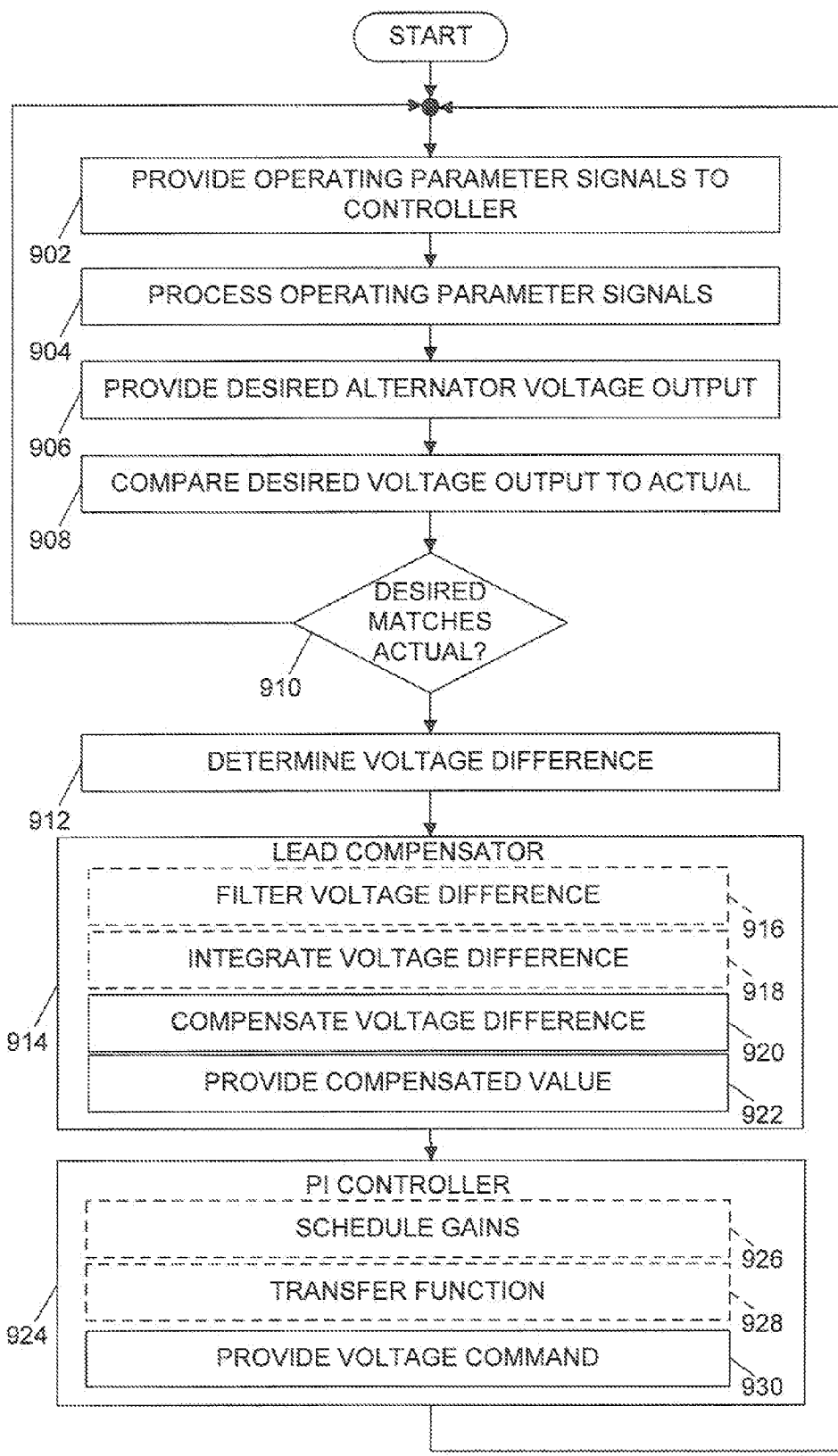
FIG. 9 is a flowchart for a method in accordance with the disclosure.

Accordingly, a flowchart for one embodiment of a method for controlling the power response of a hybrid propulsion system for a machine is shown in FIG. 9. The method is configured to improve the response of a power generation system by reducing the gap created between the inherent power generation system response and changes in load consumption. This method may be used in conjunction with or instead of previously proposed methods aimed at curtailing load consumption to match power generation capability in real time.

More particularly, the method includes providing signals indicative of various operating parameters to an electronic controller at 902. The operating parameters provided at 902 may include various machine and propulsion parameters, such as a torque command signal, an actual voltage at the output of an alternator, and the like. The electronic controller processes the various operating parameter signals at 904 and provides a desired voltage at the output of the alternator at 906. The desired voltage determined at 906 may depend on a load command, the operating state of an engine or alternator, and/or other parameters.

The desired voltage determined at 906 is compared with an actual voltage at the output of the alternator at 908. A determination whether the actual and desired voltages match is made at 910. At times when the actual voltage substantially matches the desired voltage, the process repeats starting at 902. At times when the actual and desired voltages do not match, the method proceeds at 912 with a determination of the extent of change in actual voltage that is required to reach the desired voltage. This determination is made, for example, in the illustrated embodiment by calculating a difference between the desired and actual voltage values Vdes and Vact (see FIG. 6) and by carrying out subsequent operations when the difference is non-zero.

The voltage difference determined at 912 is provided to a lead compensator at 914. The lead compensator 914 may optionally filter the voltage difference signal at 916 and/or integrate the signal at 918 for predetermined periods, as well as compensate for poles and zeros of a relevant machine system's transfer function at 920. A compensated voltage difference value is provided from the lead compensator at 922. The compensated voltage difference value represents a command signal for a desired voltage change at the output of the alternator of the system, and is provided to a proportional/integral (PI) controller at 924. The PI controller may optionally include non-linear gain scheduling at 926 and a transfer function at 928. The PI controller provides a voltage command signal 930 such as a voltage change command for the excitation voltage of the alternator. The entire process then repeats starting at 902. In one embodiment, the various parameters used in the various steps of the disclosed method may be rate-adjusted or otherwise modified parameters as previously described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of managing power generation response within an electric drive system, the electric drive system including a fuel-driven prime mover for driving an electrical power alternator controlled at least in part by an excitation voltage, the electrical power alternator making electrical power available on a DC link having a voltage characteristic and a current characteristic, the method comprising:
   determining a voltage of the DC link;
   determining a torque command by an operator of the electric drive system;
   deriving a mechanical power that is being commanded based on the torque command;
   determining a desired voltage of the DC link based on the derived mechanical power; providing an excitation voltage command signal to the electrical power alternator based on the desired voltage of the DC link by use of a closed loop controller, wherein the excitation voltage command signal is determined based on a difference value between the voltage of the DC link and the desired voltage of the DC link; and
   applying an excitation field to the electrical power alternator based on the excitation voltage command signal.

2. The method of managing power generation response according to claim 1, wherein determining the desired voltage of the DC link includes retrieving data from a table.

3. The method of managing power generation response according to claim 1, wherein the closed loop control system is a proportional/integral (PI) controller.

4. The method of managing power generation response according to claim 3, further comprising scheduling at least one of a proportional gain and an integral gain based on the desired voltage of the DC link.

5. The method of managing power generation response according to claim 1, further comprising determining a modified parameter for the voltage of the DC link by use of at least one dynamic rate limiter function.

6. The method of managing power generation response according to claim 5, further comprising compensating a difference value by at least one of a pole and a zero of a transfer function representative of a time response of the alternator to provide a compensated error value.

7. The method of managing power generation response according to claim 6, wherein the closed loop controller is a proportional/integral controller.

8. The method of managing power generation response according to claim 7, wherein the compensated difference value is provided to the proportional/integral controller, which provides the excitation voltage command signal.

9. A controller for managing power generation response within an electric drive system, the electric drive system including a fuel-driven prime mover for driving an electrical power alternator controlled at least in part by an excitation voltage, the electrical power alternator making electrical power available on a DC link having a voltage characteristic and a current characteristic, the controller including computer-executable instructions on a computer-readable medium, the computer-executable instructions comprising:
- instructions for determining a voltage of the DC link;
- instructions for determining a torque command by an operator of the electric drive system;
- instructions for deriving a mechanical power that is being commanded based on the torque command;
- instructions for determining a desired voltage of the DC link based on the derived mechanical power;
- instructions for providing an excitation voltage command signal to the electrical power alternator based on the desired voltage of the DC link by use of a closed loop controller,
- wherein the excitation voltage command signal is determined based on a difference value between the voltage of the DC link and the desired voltage of the DC link; and
- instructions for applying an excitation field to the electrical power alternator based on the excitation voltage command signal.

10. The controller for managing power generation response according to claim 9, wherein determining the desired voltage of the DC link includes retrieving data from a table.

11. The controller for managing power generation response according to claim 9, wherein the closed loop control system is a proportional/integral (PI) controller.

12. The controller for managing power generation response according to claim 11, further comprising scheduling at least one of a proportional gain and an integral gain based on the desired voltage of the DC link.

13. The controller for managing power generation response according to claim 9, further comprising compensating the difference value by at least one of a pole and a zero of a transfer function representative of a time response of the alternator to provide a compensated difference value.

14. The controller for managing power generation response according to claim 13, further comprising instructions for determining a modified parameter for the voltage of the DC link by use of at least one dynamic rate limiter function.

15. The controller for managing power generation response according to claim 14, wherein the compensated difference value is provided to the proportional/integral controller, which provides the excitation voltage command signal.

16. A non-transitory computer-readable medium having thereon computer-executable instructions for managing power generation response within an electric drive system, the electric drive system including a fuel-driven prime mover for driving an electrical power alternator controlled at least in part by an excitation voltage, the electrical power alternator making electrical power available on a DC link having a voltage characteristic and current a characteristic, a controller including the computer-executable instructions on the non-transitory computer-readable medium, the computer-executable instructions comprising:
- instructions for determining a voltage of the DC link;
- instructions for determining a torque command by an operator of the electric drive system;
- instructions for deriving a mechanical power that is being commanded based on the torque command;
- instructions for determining a desired voltage of the DC link based on the derived mechanical power;
- instructions for providing an excitation voltage command signal to the electrical power alternator based on the desired voltage of the DC link by use of a closed loop controller,
- wherein the excitation voltage command signal is determined based on a difference value between the voltage of the DC link and the desired voltage of the DC link; and
- instructions for applying an excitation field to the electrical power alternator based on the excitation voltage command signal.

17. The computer-readable medium according to claim 16, further comprising compensating the difference value by at least one of a pole and a zero of a transfer function representative of a time response of the alternator to provide a compensated difference value.

18. The computer-readable medium according to claim 17, further comprising instructions for determining a modified parameter for the voltage of the DC link by use of at least one dynamic rate limiter function.

19. The computer-readable medium according to claim 18, wherein the compensated difference value is provided to the proportional/integral controller, which provides the excitation voltage command signal.

* * * * *